ically to the rim by tongue-and-groove type con-

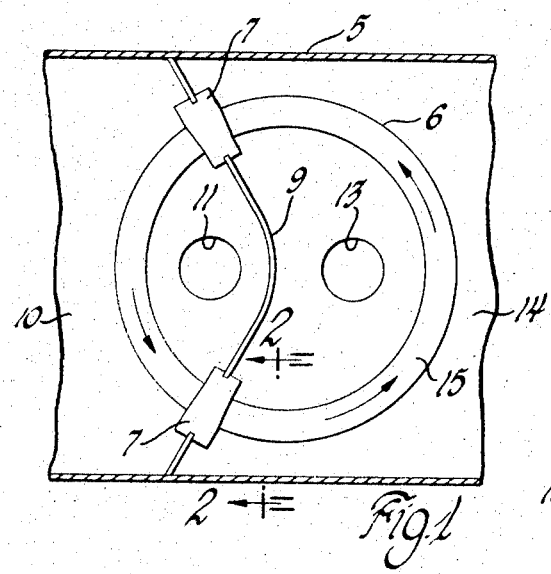
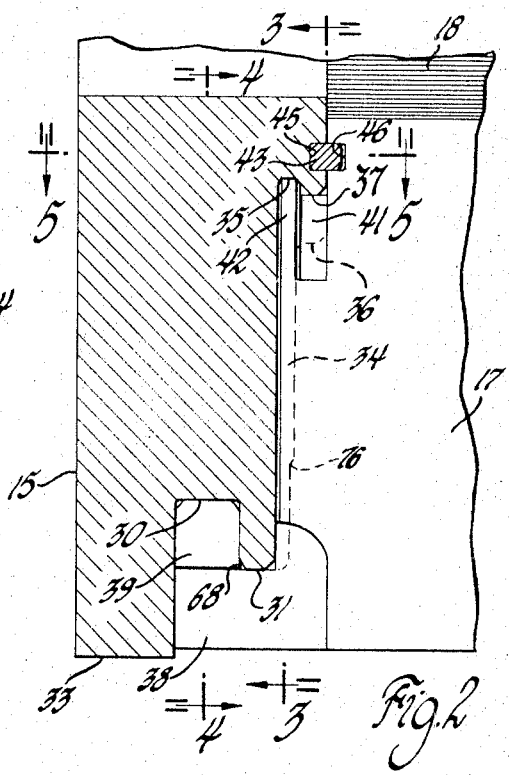
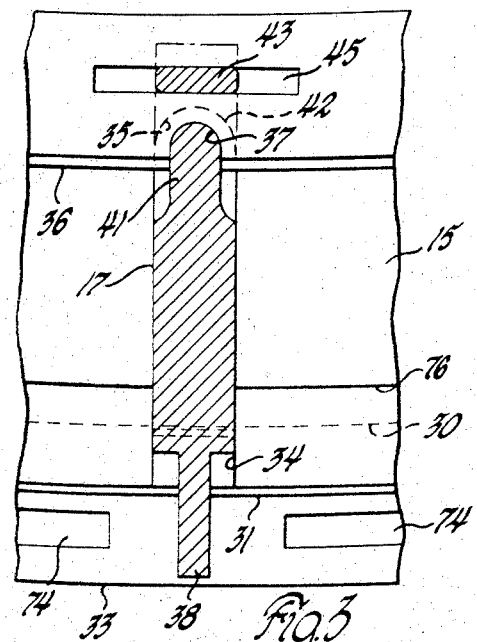
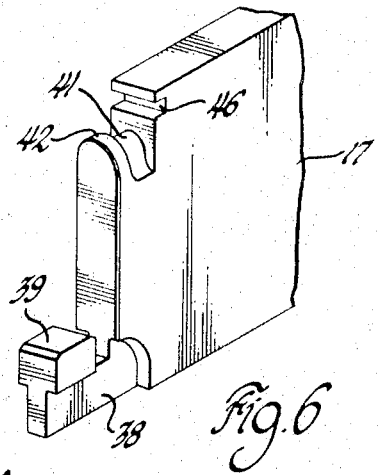
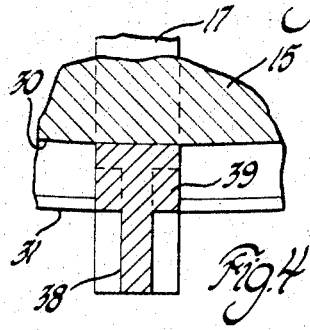
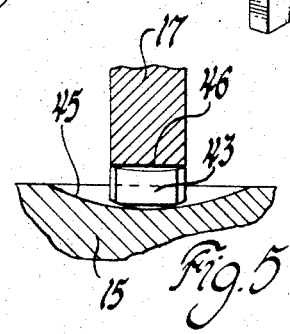

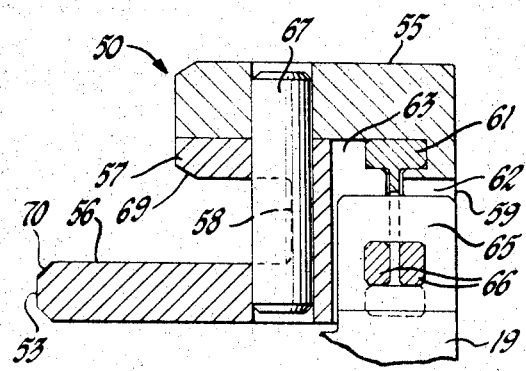
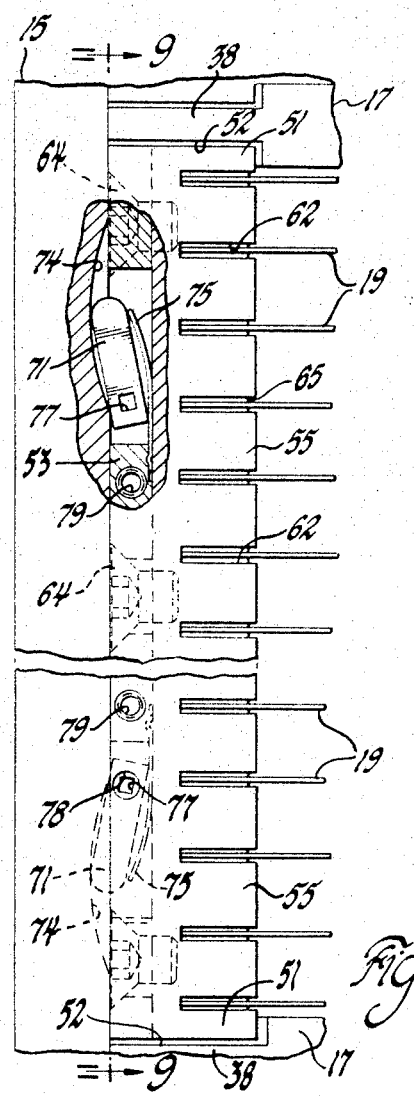
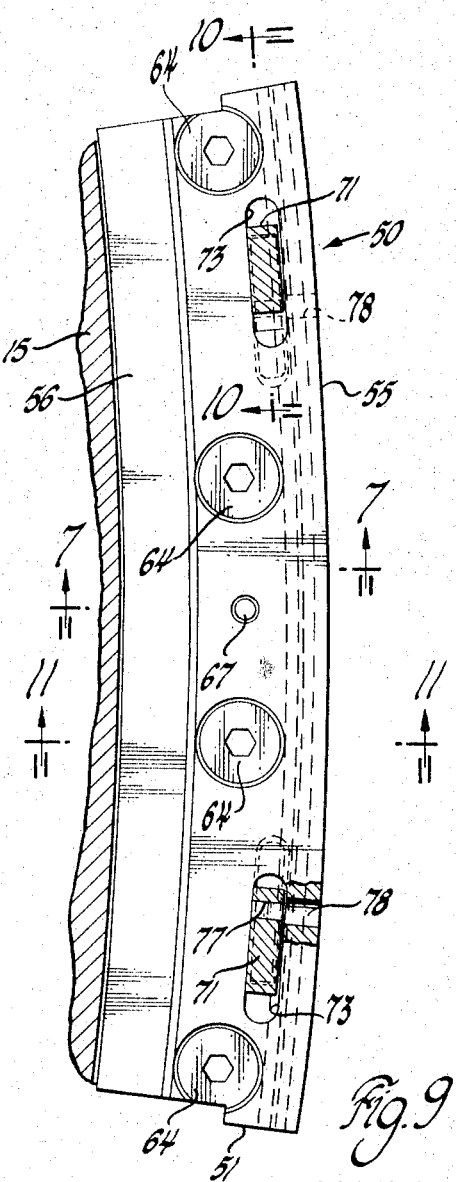

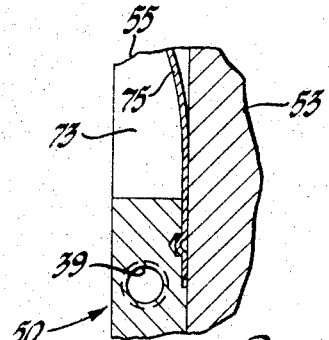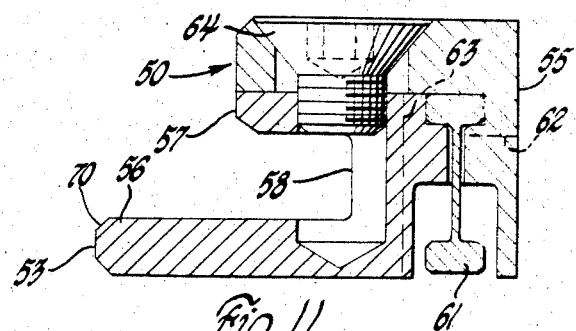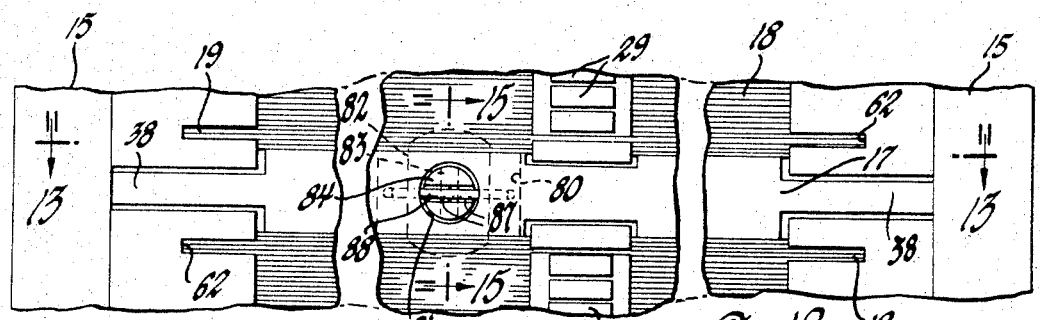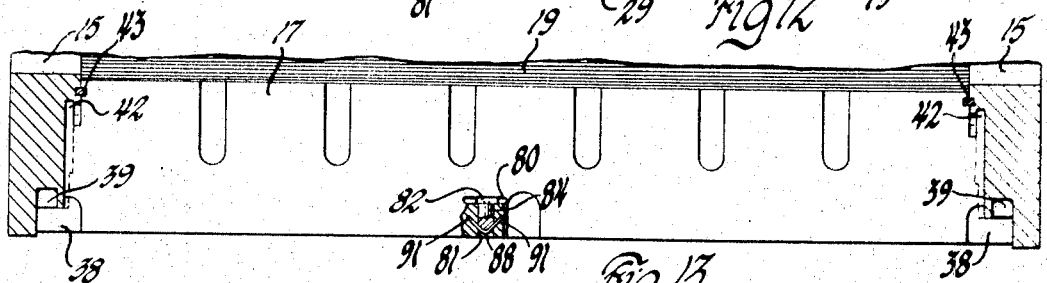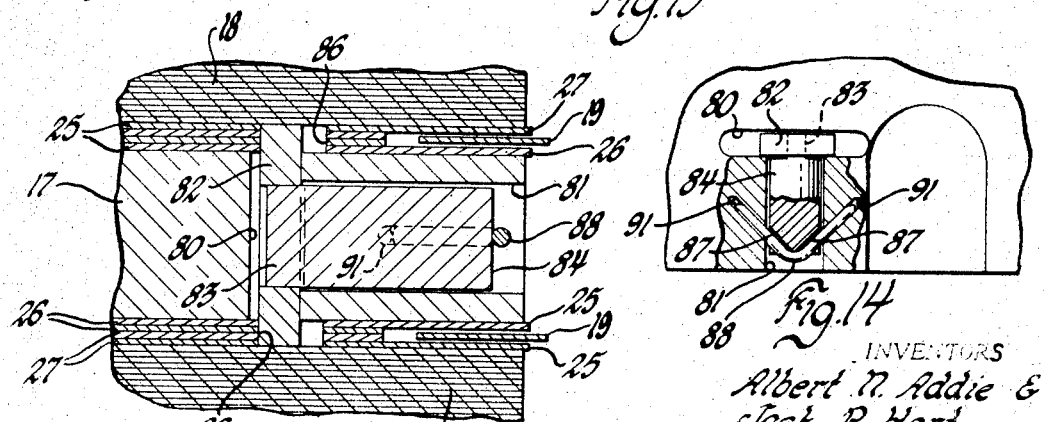

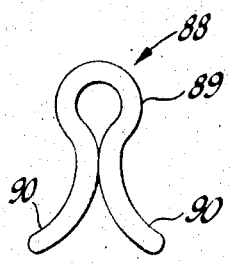
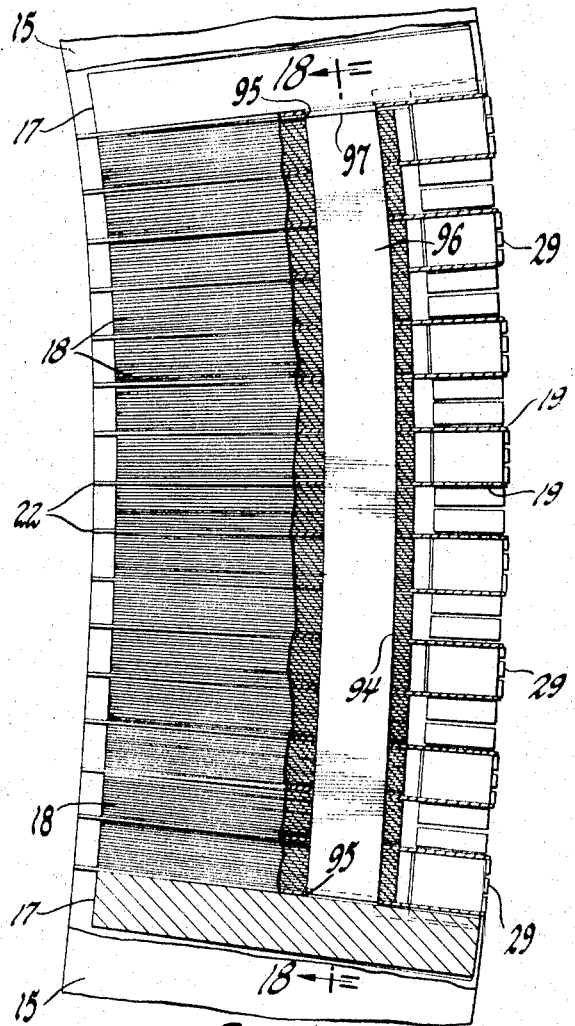
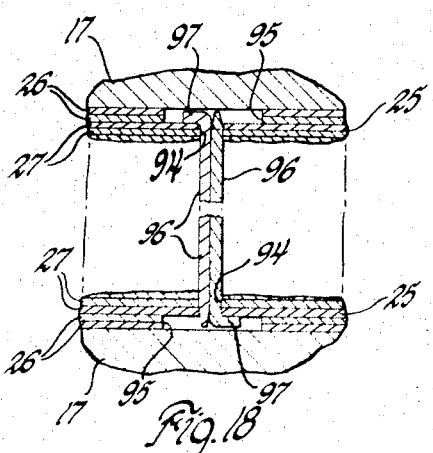
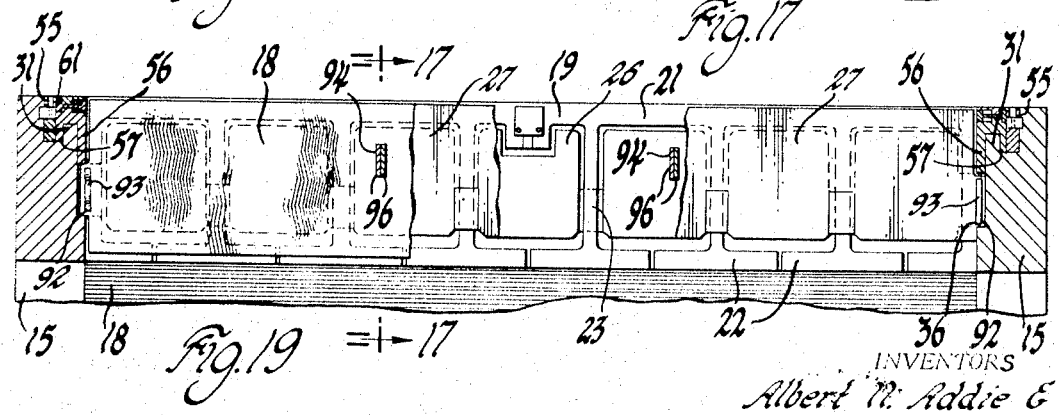

United States Patent Office 3,435,888
Patented Apr. 1, 1969

3,435,888
REGENERATOR MATRIX FRAME
Albert N. Addie, La Grange, and Jack P. Hart, Hinsdale, Ill., assignors to General Motors Corporation, Detroit, Mich., a corporation of Delaware
Filed Oct. 9, 1967, Ser. No. 673,868
Int. Cl. F28d 19/04
U.S. Cl. 165—9        9 Claims

ABSTRACT OF THE DISCLOSURE

A radial-flow rotary regenerator matrix includes two coaxial steel rims. Twenty-five rigid steel stiffeners are joined rigidly to the rim by tongue-and-groove type connections and keyed against disconnection. Labyrinth seal elements mounted in spacer plates are alternated with sheet metal shim pack heat transfer material in segments between the stiffeners, received in grooves in the inner face of the rims. Circumferential keepers fitted in slots in the shim pack and spacers hold these parts aligned.

---

The seal elements are held in tension by support bars which fit over shoulders on the outside of the rims, the bars being retained by latches.

The spacers next to the stiffeners are keyed to the stiffeners to prevent relative radial shifting of the spacers. The keys are held operative by a deformable wire lock.

Our invention relates to matrices for rotary regenerators and particularly to an improved framework of rims and stiffeners on which the heat transfer material and sealing elements of the matrix are supported. The invention seems most suited to radial-flow regenerators, but it is also applicable to axial-flow regenerators.

It has been prior practice to employ a frame comprising coaxial rims and stiffeners connecting the rims to provide a rigid squirrel-cage framework for the matrix structure. See, for example, the following United States patents: Collman et al. 2,937,010, issued May 17, 1960; Bubniak et al. 3,181,603, issued May 4, 1965, and Haig et al. 3,282,329, issued Nov. 1, 1966.

A matrix for a large regenerator is disclosed in our United States patent applications referred to below. It employs a structure with stiffeners coupled to the rims by bolts extending through the rims into the stiffeners.

The rims were of high strength Ladish Co. D–11 tool steel hardened to Rockwell C 50, the holes in the rim being made by electrical discharge machining after hardening. There also were bolt holes so made to attach sealing element retainers to the rim.

In operation, radial cracking of the rims has occurred due to cyclic stressing as sections of the matrix rotate alternately from high pressure to low pressure regions. In addition, circumferential tension is imposed at the outside diameter of the rim due to radial thermal gradient from inside to outside. The cracks in the rim occur despite the fact that the stress levels are considerably below the endurance limit of the D–11 tool steel and were found to start in microcracks left in the extremely hard (60 Rockwell C) surface in the holes in the region of highest stress concentration.

The present rim structure eliminates the necessity of using bolt holes in the rim, thereby eliminating the electrical discharge machining process and the necessity for expensive high temperature bolting. The hardness of the rim has been reduced to 40–45 Rockwell C which improves the ductility and makes milling possible.

Our present invention eliminates the bolt holes to retain the stiffeners, and the sealing element retainer holes have been eliminated by an invention of Christianson and Hart Ser. No. 673,865, Oct. 9, 1967.

According to our present invention, the stiffeners are coupled to the rims by a sort of tongue-and-groove or interlocking flange arrangement so that the bolts and bolt holes are eliminated and assembly of the matrix is greatly facilitated.

The present structure is advantageous in eliminating the electric discharge machining, which is expensive and resulted in microcracks. It eliminates expensive high temperature bolts and the stress concentrations in the rim due to bolt holes. The strength and durability of the rim are increased.

The principal objects of our invention are to increase the endurance and to decrease the cost of regenerator matrices, and to provide a regenerator better suited to the requirements of practice, particularly in the larger sizes.

In its preferred form, the invention is incorporated in a radial-flow regenerator matrix which may be considered to be a development of or improvement on the prior matrices disclosed in patent applications of common ownership with this application as follows: Wall, Ser. No. 425,789 filed Jan. 15, 1965 for Matrix Seal; Addie and Hart, Ser. No. 484,219 filed Sept. 1, 1965 and now abandoned for Regenerator Matrix; Addie, Ser. No. 644,860 filed June 9, 1967 now Patent No. 3,384,156 for Rotary Regenerator; Addie and Hart, Ser. No. 653,288 filed June 12, 1967 now Patent No. 3,368,613 for Regenerator Matrix; and Addie and Hart, Ser. No. 645,174 filed June 12, 1967 now Patent No. 3,367,405 for Matrix Seal. The improved regenerator matrix described herein embodies inventions other than that claimed in this application, as pointed out at the conclusion of the specification.

The nature of this invention and its advantages will be clear to those skilled in the art from the succeeding detailed description of the preferred embodiment of the invention and the accompanying drawings thereof.

FIGURE 1 is a schematic representation of a radial-flow rotary regenerator illustrating the environment of a matrix according to this invention.

FIGURE 2 is a fragmentary sectional view of the matrix frame taken on a plane containing the axis of the matrix as indicated by the line 2—2 in FIGURE 1, showing a part of FIGURE 13 to a large scale.

FIGURE 3 is a sectional view taken on the plane indicated by the line 3—3 in FIGURE 2.

FIGURE 4 is a fragmentary sectional view taken on the plane indicated by the line 4—4 in FIGURE 2.

FIGURE 5 is a fragmentary sectional view taken on the plane indicated by the line 5—5 in FIGURE 2.

FIGURE 6 is an axonometric view of one end of a stiffener.

FIGURE 7 is a transverse section showing a matrix seal support and the connection to a seal element taken on the planes indicated by the line 7—7 in FIGURE 9.

FIGURE 8 is a partial exterior view of one rim of the matrix and adjacent structure, with parts cut away and in section.

FIGURE 9 is a view of the matrix seal support taken on the plane indicated by the line 9—9 in FIGURE 8.

FIGURE 10 is a detail sectional view taken on the plane indicated by the line 10—10 in FIGURE 9.

FIGURE 11 is a transverse section showing a matrix seal support taken on the plane indicated by the line 11—11 in FIGURE 9.

FIGURE 12 is a partial exterior view of the matrix.

FIGURE 13 is a sectional view of the matrix taken on a plane containing the axis thereof as indicated by the line 13—13 in FIGURE 12, with parts cut away.

FIGURE 14 is an enlarged view of a portion of FIGURE 13.

FIGURE 15 is a fragmentary sectional view on a plane perpendicular to the matrix axis as indicated by the line 15—15 in FIGURE 12.

FIGURE 16 is an enlarged view of a keeper before insertion.

FIGURE 17 is a partial sectional view of the matrix taken in the plane perpendicular to the axis thereof indicated by the line 17—17 in FIGURE 19.

FIGURE 18 is a sectional view taken on the surface indicated by the line 18—18 in FIGURE 17.

FIGURE 19 is a transverse section of the matrix taken generally in a plane containing the axis thereof, with parts cut away.

Referring first to FIGURE 1, a rotary regenerator of the radial-flow type, as illustrated schematically, includes a housing 5 within which an annular matrix 6 is mounted for rotation about its axis. As the matrix rotates, it passes through main seals 7 mounted in a bulkhead 9 which divides the housing into two sections through which different fluids flow to exchange heat with the matrix and indirectly with each other. In a typical installation, cool air may enter at 10, flow radially inward through the portion of the matrix ahead of bulkhead 9, and then leave the regenerator through an outlet 11. Hot gas may enter the regenerator through an inlet 13 and flow radially outward through the remaining portion of the matrix to a gas outlet 14. Details of the arrangements for supporting, driving, and sealing the matrix may be as described in the applications referred to above, and there is no need to enlarge upon them here. The present invention is directed to the structure of the matrix itself.

The basic structure of the matrix includes two annular rims 15 (FIGURES 2, 3, and 13) and a number of stiffeners 17 (twenty-five in the particular case) distributed around the circumference of the matrix and extending from one rim to the other parallel to the axis of the matrix. The stiffeners are rigidly connected to the rims to provide a squirrel-cage structure which is the framework on which the heat transfer and sealing structure of the matrix is mounted. This structure includes foraminous heat transfer material 18 in the form of stacks or packs of corrugated thin stainless steel sheets extending from one rim to the other. In the particular example, there are fifteen packs of the heat transfer material between each two adjacent stiffeners. An arrangement of a labyrinth seal element and spacers for the labyrinth element seal is disposed between each two adjacent packs of the heat transfer material and at each side of each stiffener. This structure is preferably as disclosed in the Addie and Hart application Ser. No. 645,174. The labyrinth seal elements 19 (FIGURES 7, 8, 15, 17, and 19) include a sealing strip 21 extending across the outer periphery of the matrix and attached at its ends to the rims 15, a segmented inner periphery sealing strip 22, and struts 23 coupling the segments of the inner strip to the outer strip. The strips 21 are maintained in tension to preserve their rectilinearity notwithstanding the normal thermal distortion of the matrix in operation. Each labyrinth seal element 19 is mounted within a spacer 25 made up of two spacer plates 26 and 27 which provide a space between them for the seal element and resist the circumferential pressure of the heat transfer material so that the labyrinth seal elements are free to move or adjust radially with respect to the heat transfer pack. Each two adjacent labyrinth seal elements 19 are coupled at the outer periphery of the matrix by a follower 29 which cooperates with structures in the main seals 7 as described in application No. 645,174.

The structure of the matrix is such that each individual segment of the heat exchange and sealing structure between adjacent stiffeners 17 may be assembled as a unit and then be put into the regenerator assembly, or may be removed as a unit. Also, individual stiffeners 17 may be removed if desired.

We may proceed now to the structure of the interconnection between the rims and stiffeners, with particular reference to FIGURES 2 to 6, inclusive, and 13. This is an important feature of the improved regenerator matrix since it provides an easily fitted secure connection between the rim and stiffeners while eliminating stress risers resulting from the use of bolts to fasten the rims to the stiffeners in the prior structure. FIGURES 3, 4, and 5 show the matrix frame with the heat transfer pack omitted. The rim 15 which, as stated, is of an annular or ring shape has its outer surface turned away at the inner face; that is, the face toward the opposite rim, to provide a circumferential groove 30 and a ridge 31 which is of less radius than the outer diameter of the rim at 33. At the location of each stiffener the inner face of the rim is milled to provide a radial slot 34. The radially inner end of the slot extends into a shoulder 36 on the rim and terminates in a rounded recess 35 overlaid by a ledge 37 overhanging the radially inner part of slot 34. The stiffeners 17 have at each end at the outer edge an extension 38 which bears a block 39 serving as a tongue to lodge in the groove 30. The extension 38 is of less width than the stiffeners 17 to provide a recess for the end of a seal support bar to be described. The stiffener 17 is machined to provide an arcuate nose 41 terminating in a semicircular tongue 42 which is in tongue-and-groove engagement in the recess 35 behind the ledge 37.

Thus, the stiffener is fixedly engaged with the rim by simply sliding it into the radial slot 34 and lodging the tongues 39 and 42 in the grooves provided for them in the rim. The stiffener is held against sliding out of the rim by a key 43 inserted into an arcuate keyway 45 in the inner face of the rim and a key slot 46 in the end of the stiffener. Key 43 cannot slide out of place once the sections of the matrix on each side of the stiffener are put in place since they abut the ends of key 43.

We may now consider the improved arrangement for mounting and tensioning the labyrinth seal elements. This structure is advantageous in that it provides for ready assembly of the sections of the matrix into the spaces between the stiffeners 17 and particularly in that it eliminates the holes in prior structures for bolts to connect the sealing element retainers to the rims. Referring particularly to FIGURES 7 to 12, inclusive, an arcuate seal support or support bar 50 extends in abutment with the rim from each stiffener 17 to the next adjacent stiffener. The ends 51 of the seal supports constitute projections received in recesses 52 in the stiffeners 17 adjacent the extensions 38. These provide a safety feature against possible dislodgment of the stiffener. Each seal support 50 comprises two principal parts, a base 53 and a retainer 55. Referring also to FIGURE 19, the base 53 is of generally channel-shaped configuration including a longer leg 56 which abuts the inner face of the rim and a shorter leg 57. The groove 58 between the two legs fits over the ridge 31 of the rim when the matrix is assembled.

The retainer 55 is of generally L-shaped configuration, having a side lying against the outer face of leg 57 and an outer leg 59 lying in the same surface as the outer diameter 33 of the rim. An I-beam section connector 61 is clamped between the two parts 53 and 55. This connector couples directly to the labyrinth seal elements, and thus provides a tension connection between the seal elements and the support which has some flexibility, since the web of the connector can flex radially of the matrix. Slots 62 and 63 (FIGURE 7) are cut in the support parts 55 and 53 to receive the end of the labyrinth elements 19. These elements are coupled to the connectors 61 in the manner described in the prior applications of Addie and Hart. When the base 53 and retainer 55 have been put together around the connector 61 with the slots 62 properly aligned, the alignment of the parts is preserved by drilling and reaming the base and retainer and inserting a fitted pin 67 adjacent the center of the seal support. Ridge 31 of the rim is notched to clear this pin.

The base 53 and retainer 55 are held in assembled relation by four countersunk socket head machine screws 64, the end ones of which have the heads partially cut away to avoid interference with the stiffeners.

Referring to FIGURE 7, the labyrinth elements 19 bear tabs 65 which extend into slots 62 and 63 and into slots in connector 61 aligned with them. Arcuate rectangular keys 66 extending the length of the seal support extend through holes in tabs 65 and bear against the flange of connector 61.

Referring to FIGURES 2 and 7, it will be noted that there is a chamfer 68 on the outer face of ridge 31 and a chamfer 69 on leg 57 of the base 53. This permits the seal support to be forced over ridges 31 although there in a slight dimensional interference sufficient to stretch the seal elements about one- to two-tenths of one percent of their length and put them in appreciable tension. This tension tends to rotate the support bar 50 on the rim ridge 31. A counteracting moment is provided by slightly springing leg 56 of base 53. The end of this leg is forced over a step 76, which is 0.005 to 0.009 inch high in this particular structure, on the inner face of rim 15. See FIGURES 2 and 3. A chamfer 70 on leg 56 (FIGURES 7 and 11) rides over the step 76. The spring force thus exerted by leg 56 maintains the labyrinth seal elements in the proper position.

With the leg 57 lodged behind ridge 31, there is no particular radial force tending to separate these parts, but some sort of positive lock or latch is highly desirable. The latch is provided by a key 71 disposed loosely in an elongated recess 73 in the outer leg of retainer 55. Key 71 is biased into an arcuate slot 74 in the inner face of rim 15 (see also FIGURE 3) by a leaf spring 75 caught between the two parts 53 and 55. There is a key 71 at each end of the seal support 50. Each key is formed with a square hole 77 to receive a wrench (not illustrated) which may be inserted through a radial hole 78 (FIGURE 9) in the retainer 55. When the retainers are pushed into place, the keys automatically engage but they may be disengaged by the wrench. Tapped holes 79 in part 55 provide for attachment of pullers for removing the matrix segment.

We may now proceed to the means to couple the spacers 25 abutting the stiffeners 17 to the stiffeners to overcome the undesirable working or radial shifting of the spacers due to the different thermal distortion characteristics of the spacers and stiffeners. Referring particularly to FIGURES 12 to 16, inclusive, each stiffener 17 has a slot 80 cut through it adjacent the radially outer edge and substantially midway between the ends of the stiffener. A bore 81 extends into the slot 80 from the outer surface of the stiffener. A turn button 82 mounted in the slot has a central mortise which receives a tenon 83 on a shaft 84 fitted in the bore 81. The two plates 26 and 27 of the spacer 25 mounted adjacent the stiffener on each side are formed with slots 86 which receive the turn button 82 when it rotates so as to project from the stiffener as illustrated. When rotated 90° from the position illustrated, the turn button does not project from the stiffener, and it is in this position when the heat exchange segment including the seal elements and spacers is inserted between the stiffeners. After the heat exchange material is installed on each side of the stiffener, the turn button is rotated so as to engage in the slots 86 and positively connect the spacers adjacent the stiffeners to the stiffeners so that differential warping will not work the spacers outwardly from the matrix.

The outer end of shaft 84 is formed with two opposed kerfs 87 making about a 45° angle with the axis of the shaft. These may be engaged by a special tool to rotate the turn button. The position of the shaft is then secured by a wire lock 88. This is a clothespin-shaped piece of wire (see FIGURE 16) with a head 89 defined by the rebent wire and with legs 90 which is driven into the kerfs 87 and spread so that its ends extend into drilled holes 91 in the stiffener. The turn button is thus positively locked. It can be released by drilling or grinding off the bend in wire 88 and pulling out the sections from the holes 91.

The arrangement of circumferentially extending keepers which connect the stacks of heat transfer shim material 18 and the spacers 25 so that relative radial shifting or unevenness of the matrix is prevented as illustrated principally in FIGURES 17, 18, and 19. Referring to FIGURE 19 it will be seen that the foraminous heat transfer material has tongues 92 and the spacer elements 26 and 27 have tongues 93 which are received in an annular recess in the rim 15 defined between an outwardly facing shoulder 36 on the rim and the inner edge of seal support base 53. Thus, these parts are aligned by the rim structure at the ends of the matrix. A rectangular slot 94 is provided in each element of the transfer material and in all of the spacer plates 25, but not in the spacer plates 26 immediately adjacent the stiffeners. Larger rectangular holes 95 are made in plates 26. Two arcuate circumferential strip stock keepers 96 are threaded through the aligned slots 94, extending from one stiffener to another. Each keeper has a bent-over head 97 at one end which is received in the hole 95 in the spacer plate 26 adjacent the stiffener, and which bears against the spacer plate 27. This prevents the spacer plates from working free of the ends of the keys which might otherwise occur with working of the matrix in service. The unheaded ends of keepers 96 ordinarily are closely adjacent to or in contact with the stiffener. If there is a slight increase in the dimension from one stiffener to another, the keepers can slide along each other, but there always is one keeper in each plate or shim and ordinarily two keepers in each, except perhaps in the spacer 25 adjacent the stiffener. By this means the heat exchange structure including the spacers is kept in proper alignment to avoid roughness or projecting elements which might interfere with proper operation of the regenerator.

When this improvement is coupled to the means for connecting the spacer 25 to the stiffener as described above, the dependability of the matrix is much enhanced.

It will be celar to those skilled in the art from the foregoing that the improved matrix structure according to our invention is highly advantageous and has the beneficial results referred to in the introductory portion of this specification.

This specification discloses several improvements in regenerator matrices which cooperate with our invention in providing a better matrix. These are claimed in patent applications, filed on the same day as this application, as follows: Ser. No. 673,866, filed Oct. 9, 1967, Keyed Matrix, David M. Lyon; Ser. No. 673,867, filed Oct. 9, 1967, Regenerator Matrix, Albert N. Addie and Charles Rose; and Ser. No, 673,865, filed Oct. 9, 1967, Matrix Seal Retainer, Wallace A. Christianson and Jack P. Hart.

The detailed description of the preferred embodiment of the invention for the purpose of explaining the principles thereof is not to be considered as limiting or restricting the invention, as many modifications may be made by the exercise of skill in the art.

We claim:

1. A rotary regenerator matrix comprising, in combination, two coaxial annular rims, a plural number of stiffeners each fixed to and connecting the rims, the rims and stiffeners providing a framework for supporting foraminous heat transfer material, and foraminous heat transfer material mounted in spaces defined between the rims and between the stiffeners;

the rims having slots extending from one edge of the rims receiving the ends of the stiffener, each stiffener being slidable into the corresponding slots of the two rims to locate the stiffener, interengaging lugs on the stiffener and on the rims retaining the stiffeners against movement out of the slots in the direction away from the rim, and means coupling each stiffener to each rim so as to prevent sliding of the stiffener within the slot.

2. A matrix as recited in claim 1 in which there are two sets of interengaging lugs on the stiffener and rim at each end of the stiffener, one set being adjacent each edge of the stiffener.

3. A matrix as recited in claim 1 in which a lug on the rim is defined by the wall of a circumferential groove in the rim.

4. A matrix as recited in claim 1 in which a lug on the rim is defined by an undercut portion of the said slot.

5. A matrix as recited in claim 1 in which the last-recited means is a key engaging the stiffener and rim.

6. A rotary regenerator matrix comprising, in combination, two coaxial annular rims, each rim having a generally radial face directed toward the other rim, a plural number of stiffeners spaced circumferentially of the rims extending from one rim to the other, the rims and stiffeners defining spaces for foraminous heat transfer material, and means for connecting the stiffeners rigidly to the rims comprising, at each junction between a rim and a stiffener:

radially and axially extending shoulders on the rim defining a radially-extending slot in the rim face to receive the end of the stiffener, means defining a tongue-and-groove connection between the stiffener and rim engageable by relative radial movement of the stiffener and rim and retaining them against relative axial movement, and means engaging the rim and stiffener blocking relative radial movement thereof.

7. A matrix as recited in claim 6 in which a portion of the slot is undercut to define a tongue-and-groove connection.

8. A matrix as recited in claim 6 in which a tongue on the stiffener engages in a circumferential groove in the radially outer surface of the rim.

9. A matrix as recited in claim 6 embodying two tongue-and-groove connections between the stiffener and rim, one adjacent each edge of the stiffener.

References Cited
UNITED STATES PATENTS

| | | | |
|---|---|---|---|
| 2,937,010 | 5/1960 | Collman et al. | 165—10 |
| 3,181,603 | 5/1965 | Bubniak et al. | 165—9 |
| 3,282,329 | 11/1966 | Haig et al. | 165—8 |

ROBERT A. O'LEARY, *Primary Examiner.*

ALBERT W. DAVIS, *Assistant Examiner.*

U.S. Cl. X.R.

165—10

PO-1050
(5/69)

UNITED STATES PATENT OFFICE
CERTIFICATE OF CORRECTION

Patent No. 3,435,888  Dated  April 1, 1969

Inventor(s) Albert N. Addie and Jack P. Hart

It is certified that error appears in the above-identified patent and that said Letters Patent are hereby corrected as shown below:

Column 1, lines 24 through 29 inclusive, delete the following two paragraphs, which should be part of the Abstract of the Disclosure and not of the specification:

"The seal elements are held in tension by support bars which fit over shoulders on the outside of the rims, the bars being retained by latches.

"The spacers next to the stiffeners are keyed to the stiffeners to prevent relative radial shifting of the spacers. The keys are held operative by a deformable wire lock."

Column 5, line 13, delete "in" and substitute -- is --.

Column 6, line 6, delete "as" and substitute -- is --.

SIGNED AND
SEALED
MAR 31 1970

(SEAL)
Attest:

Edward M. Fletcher, Jr.
Attesting Officer

WILLIAM E. SCHUYLER, JR.
Commissioner of Patents